(12) United States Patent
Shetney et al.

(10) Patent No.: US 9,050,561 B1
(45) Date of Patent: Jun. 9, 2015

(54) REDUCTANT QUALITY SYSTEM INCLUDING RATIONALITY DIAGNOSTIC

(71) Applicant: GM Global Technology Operations LLC, Detroit, MI (US)

(72) Inventors: Justin Adam Shetney, Livonia, MI (US); Min Sun, Troy, MI (US); John A. Catalogna, Commerce Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/226,050

(22) Filed: Mar. 26, 2014

(51) Int. Cl.
| | |
|---|---|
| *B01D 53/94* | (2006.01) |
| *F01N 3/20* | (2006.01) |
| *F01N 11/00* | (2006.01) |
| *G05B 1/00* | (2006.01) |
| *G05B 21/00* | (2006.01) |
| *G05D 21/02* | (2006.01) |

(52) U.S. Cl.
CPC ............ *B01D 53/9495* (2013.01); *G05D 21/02* (2013.01)

(58) Field of Classification Search
CPC ...... B01D 53/94; B01D 53/9495; F01N 3/20; F01N 11/00; G05B 1/00; G05B 21/00
USPC ......... 423/213.2; 60/274, 276, 277, 287, 295, 60/301; 700/271
See application file for complete search history.

(56) References Cited

U.S. PATENT DOCUMENTS

| | | | | |
|---|---|---|---|---|
| 6,017,503 | A  * | 1/2000 | Kato et al. ..................... | 423/235 |
| 2012/0272639 | A1 * | 11/2012 | Kleinfeld ........................ | 60/274 |

* cited by examiner

*Primary Examiner* — Timothy Vanoy
(74) *Attorney, Agent, or Firm* — Cantor Colburn LLP

(57) ABSTRACT

An exhaust gas treatment system includes a reductant delivery system configured to introduce a reductant solution to an exhaust gas flowing through the exhaust gas treatment system. A selective catalyst reduction device is configured to chemically react with the reductant solution to induce a NOx conversion that reduces a level of NOx in the exhaust gas. A reductant quality sensor is configured to generate an electrical signal indicating a quality of the reductant solution. The exhaust gas treatment system further includes a rationality diagnostic control module configured to rationalize the reductant quality sensor based on a comparison between the quality of the reductant solution and the NOx conversion.

20 Claims, 2 Drawing Sheets

REDUCTANT QUALITY SYSTEM INCLUDING RATIONALITY DIAGNOSTIC

FIELD OF THE INVENTION

The present disclosure relates to exhaust gas treatment systems, and more specifically, to an exhaust gas treatment system including a reductant quality system.

BACKGROUND

Exhaust gas emitted from an internal combustion (IC) engine, is a heterogeneous mixture that may contain gaseous emissions such as carbon monoxide (CO), unburned hydrocarbons (HC) and oxides of nitrogen (NOx) as well as condensed phase materials (liquids and solids) that constitute particulate matter. Catalyst compositions typically disposed on catalyst supports or substrates are provided in an engine exhaust system to convert certain, or all of these exhaust constituents into non-regulated exhaust gas components.

Exhaust gas treatment systems typically include one or more selective catalytic reduction (SCR) devices and a reductant delivery system. The SCR devices include a substrate having a washcoat disposed thereon that operates to reduce the amount of NOx in the exhaust gas. The reductant delivery system injects a reductant solution including an active reductant such as, for example, ammonia ($NH_3$), urea ($CO(NH_2)_2$), etc., which mixes with the exhaust gas. When the proper amount of reductant is supplied to the SCR device under the proper conditions, the reductant reacts with the NOx in the presence of the SCR washcoat to reduce the NOx emissions. The quality of the reductant solution may affect the efficiency at which the SCR device effectively reduces the NOx emissions.

SUMMARY OF THE INVENTION

According to at least one exemplary embodiment, an exhaust gas treatment system includes a reductant delivery system configured to introduce a reductant solution to an exhaust gas flowing through the exhaust gas treatment system. A selective catalyst reduction device is configured to chemically react with the reductant solution to induce a NOx conversion that reduces a level of NOx in the exhaust gas. A reductant quality sensor is configured to generate an electrical signal indicating a quality of the reductant solution. The exhaust gas treatment system further includes a rationality diagnostic control module configured to rationalize the reductant quality sensor based on a comparison between the quality of the reductant solution and the NOx conversion.

According to another exemplary embodiment, a rationality diagnostic control module to rationalize a reductant quality sensor that determines a quality of a reductant solution delivered by an exhaust treatment system comprises a memory unit configured to store a lookup table. The lookup table stores a plurality of quality parameters corresponding to a quality of a reductant solution and a NOx conversion threshold value corresponding to each quality parameter. An electronic NOx conversion unit is configured to determine a NOx conversion differential value based on a measured NOx conversion parameter and a modeled NOx conversion parameter. An electronic rationalization unit is configured to compare the quality of the reductant solution to the quality parameters of the lookup table to determine a corresponding NOx conversion threshold value. The electronic rationalization unit is further configured to rationalize the reductant quality sensor based on a comparison of the NOx conversion differential value and the determined NOx conversion threshold value.

In yet another exemplary embodiment, a method of rationalizing a reductant quality sensor included in an exhaust treatment system comprises introducing a reductant solution to an exhaust gas flowing through the exhaust gas treatment system. The method further includes inducing a NOx conversion that reduces a level of NOx in the exhaust gas in response to the reductant solution. The method further includes determining a quality of the reductant solution, and rationalizing the reductant quality sensor based on a comparison between the quality of the reductant solution and the NOx conversion.

The above features of the inventive teachings are readily apparent from the following detailed description of the invention when taken in connection with the accompanying drawings.

BRIEF DESCRIPTION OF THE DRAWINGS

Other features and details appear, by way of example only, in the following detailed description of embodiments, the detailed description referring to the drawings in which.

DESCRIPTION OF THE EMBODIMENTS

Figure 1:
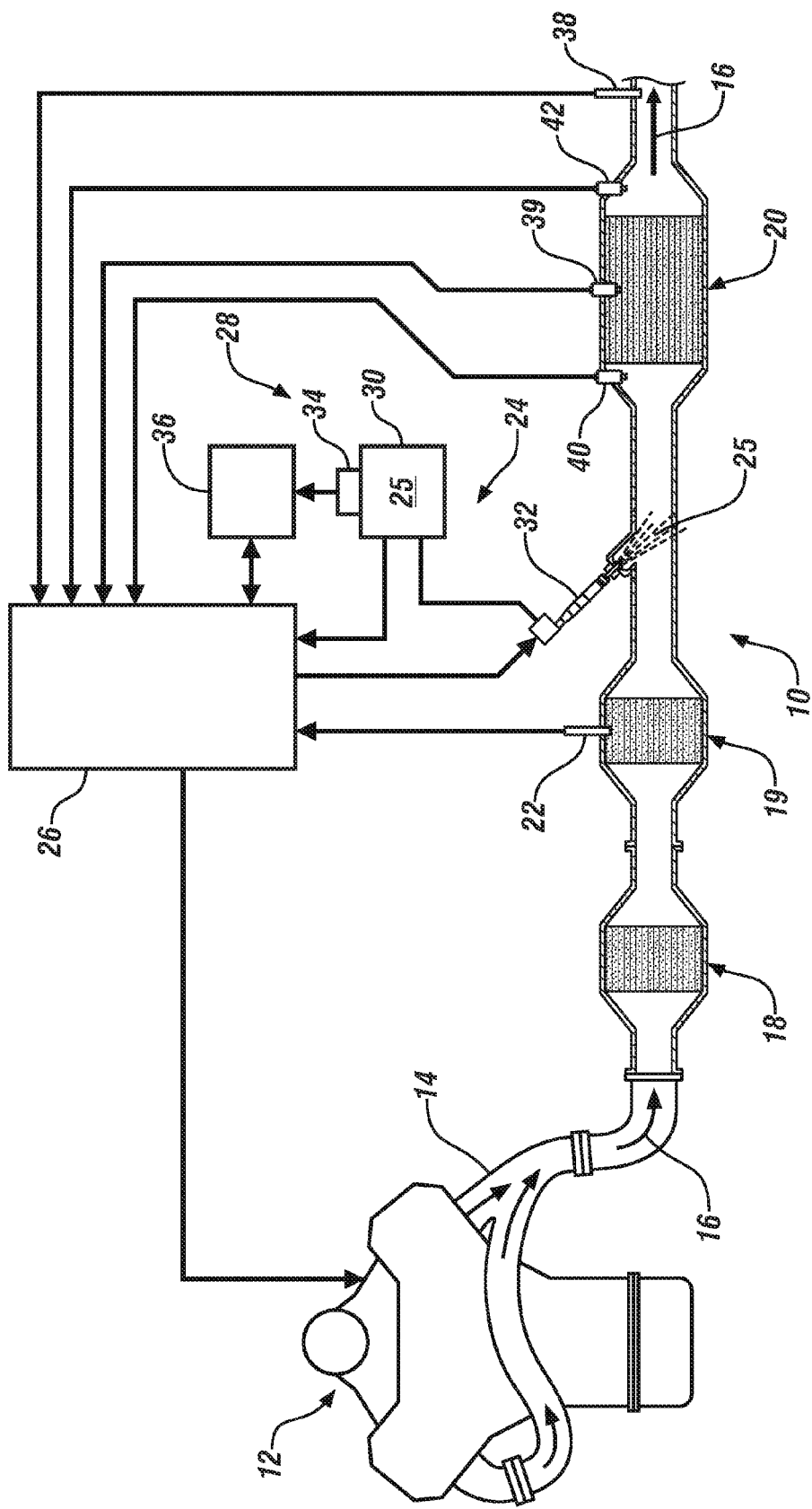
FIG. 1 is a schematic diagram of an exhaust gas treatment system including a reductant solution quality system in accordance with exemplary embodiments.

Referring now to FIG. 1, an exemplary embodiment is directed to an exhaust gas treatment system 10, for the reduction of regulated exhaust gas constituents of an internal combustion (IC) engine 12. The exhaust gas treatment system 10 described herein can be implemented in various engine systems. Such engine systems may include, for example, but are not limited to diesel engine systems, gasoline direct injection systems, and homogeneous charge compression ignition engine systems.

The exhaust gas treatment system 10 generally includes one or more exhaust gas conduits 14, and one or more exhaust treatment devices. The exhaust gas conduit 14, which may comprise of several segments, transports exhaust gas 16 from the engine 12 to the various exhaust treatment devices of the exhaust gas treatment system 10. The exhaust treatment devices include, but are not limited to, an oxidation catalyst device ("OC") 18, a particulate filter ("PF") 19, and a selective catalytic reduction ("SCR") device 20. As can be appreciated, the exhaust gas treatment system 10 of the present disclosure may include various combinations of one or more of the exhaust treatment devices 18, 19, and 20 shown in FIG. 1, and/or other exhaust treatment devices (not shown) and is not limited to the present example.

In FIG. 1, as can be appreciated, the OC 18 can be one of various flow-through, oxidation catalyst devices known in the art. In various embodiments the OC 18 may include a flow-through metal or ceramic monolith substrate that is wrapped in an intumescent matte or other suitable support that expands when heated, securing and insulating the substrate. The substrate may be packaged in a stainless steel shell or canister having an inlet and an outlet in fluid communication with the exhaust gas conduit 14. The substrate can include an oxidation catalyst compound disposed thereon. The oxidation catalyst compound may be applied as a washcoat and may contain platinum group metals such as platinum (Pt), palladium (Pd), rhodium (Rh) or other suitable oxidizing catalysts, or combination thereof. The OC 18 may treat unburned gaseous and non-volatile HC and CO, which are oxidized to form carbon dioxide and water, as well as converting NO to $NO_2$ to improve the ability of the SCR device 20 to convert NOx.

The PF 19 may be disposed downstream from the OC 18 and filters the exhaust gas 16 of carbon and other particulate matter. According to at least one exemplary embodiment, the PF 19 may be constructed using a ceramic wall flow monolith exhaust gas filter substrate that is wrapped in an intumescent or non-intumescent matte (not shown) that expands, when heated to secure and insulate the filter substrate which is packaged in a rigid, heat resistant shell or canister. The shell of the canister has an inlet and an outlet in fluid communication with exhaust gas conduit 14. It is appreciated that the ceramic wall flow monolith exhaust gas filter substrate is merely exemplary in nature and that the PF 19 may include other filter devices such as wound or packed fiber filters, open cell foams, of sintered metal fibers, for example.

Exhaust gas 16 entering the PF 19 is forced to migrate through porous, adjacently extending walls, which capture carbon and other particulate matter from the exhaust gas 16. Accordingly, the exhaust gas 16 is filtered prior to being exhausted from the vehicle tailpipe. As exhaust gas 16 flows through the exhaust gas treatment system 10, a pressure is imposed across the inlet and the outlet. One or more pressure sensors 22 (e.g., a delta pressure sensor) may be provided to determine the pressure differential (i.e., $\Delta p$) across the PF 19. Further, the amount of particulates deposited in the PF 19 increases over time, thereby increasing the exhaust gas backpressure realized by the engine 12. A regeneration operation may be performed that burns off the carbon and particulate matter collected in the filter substrate and regenerates the PF 19 as understood by those ordinarily skilled in the art.

The SCR device 20 may be disposed downstream of the PF 19. The SCR device 20 includes a catalyst containing washcoat disposed thereon. The catalyst containing washcoat may chemically react with a reductant solution to convert NOx contained in the exhaust gas into $N_2$ and $H_2O$ as understood by those ordinarily skilled in the art. The catalyst containing washcoat may contain a zeolite and one or more base metal components such as iron (Fe), cobalt (Co), copper (Cu) or vanadium (V) which can operate efficiently to convert NOx constituents in the exhaust gas 16 into acceptable byproducts (e.g., diatomic nitrogen ($N_2$) and water ($H_2O$)) in the presence of $NH_3$. The efficiency at which the SCR device 20 converts the NOx is hereinafter referred to as "NOx conversion efficiency."

The exhaust gas treatment system 10 illustrated in FIG. 1 further includes a reductant delivery system 24, a control module 26, and a reductant quality system 28. The reductant delivery system 24 introduces a reductant solution 25 to the exhaust gas 16. The reductant delivery system 24 includes a reductant supply source 30 and a reductant injector 32. The reductant supply source 30 stores the reductant solution 25 and is in fluid communication with the reductant injector 32. Accordingly, the reductant injector 32 may inject a selectable amount of reductant solution 25 into the exhaust gas conduit 14 such that the reductant solution 25 is introduced to the exhaust gas 16 at a location upstream of the SCR device 20. The reductant solution 25 may comprise an active reductant including, but not limited to, urea ($CO(NH_2)_2$), and ammonia ($NH_3$). The reductant solution 25 may be in the form of a solid, a gas, a liquid, or an aqueous urea solution. For example, the reductant solution 25 may comprise an aqueous solution of $NH_3$ and water ($H_2O$).

The solution ratio may determine the quality of the reductant solution 25 and may affect the efficiency at which SCR device 20 effectively reduces the NOx (i.e., the NOx conversion efficiency). The solution ratio may be based on an amount of $NH_3$ in the reductant solution. For example, a reductant solution 25 being of a "nominal quality" may provide a first NOx conversion efficiency when operating at effective operating conditions. The "nominal quality" may be determined as a reductant solution having a first solution ratio of 32.5% urea and 67.5% $H_2O$. A reductant solution 25 having a "reduced quality" may provide a second NOx conversion efficiency that is less than the first NOx conversion efficiency when operating at the effective operating conditions. The "reduced quality" may be determined as a reductant solution 25 having, for example, a second solution ratio of 16.25% urea and 83.75% $H_2O$. A reductant solution 25 having a "deficient quality" may provide a third NOx conversion efficiency that is less than the first NOx conversion efficiency and the second NOx conversion efficiency when operating at the effective operating conditions. The "deficient quality" may be determined as a reductant solution 25 having, for example, a third solution ratio of 5% urea and 95% $H_2O$. The effective operating conditions mentioned above may be based on an amount of $NH_3$ stored on the SCR device 20, an engine operating time, and/or a temperature of the SCR device 20.

The control module 26 may control the engine 12, the regeneration process, the reductant delivery system 24, and the reductant quality system 28 based on data provided by one or more sensors and/or modeled data stored in memory. For example, the control module 26 controls operation of the reductant injector 32 according to a reductant storage model. In various embodiments, the control module 26 may determine various parameters ($P_1$-$P_N$) of the exhaust treatment system 10 based on one more temperature sensors. In addition to the $\Delta p$, the control module 26 may determine a temperature ($T_{GAS}$) of the exhaust gas 16, a temperature ($T_{PF}$) of the PF 19, an amount of soot loaded on the PF 19, a temperature ($T_{SCR}$) of the SCR device 20, and the amount of $NH_3$ loaded on the SCR device 20. One or more sensors may output signals indicative of a respective parameter to the control module 26. For example, a first temperature sensor 38 may be disposed in fluid communication with the exhaust gas 16 to generate a signal indicative of $T_{GAS}$ and a second temperature sensor 39 may be coupled to the SCR device 20 to determine $T_{SCR}$.

The control module 26 further determines the NOx conversion efficiency. The NOx conversion efficiency may be measured to determine an actual NOx conversion efficiency and/or may be predicted using a model stored in memory of the control module 26. The measured NOx conversion efficiency may be based on, for example, a differential between a NOx level determined by first NOx sensor, i.e., an upstream NOx sensor 40, and a NOx level determined by a second NOx sensor, i.e., a downstream NOx sensor 42.

The modeled NOx conversion efficiency may predict or determine an expected NOx conversion efficiency based on one or more input parameters. The input parameters may include one or more of the parameters $P_1$-$P_N$ described above. The control module 26 may then utilize the NOx conversion model to predict an expected NOx conversion efficiency as a function of the one or more parameter input values.

The reductant quality system 28 includes a reductant quality sensor 34 and a rationality diagnostic control module 36. The reductant quality sensor 34 is in electrical communication with the reductant solution 25 stored in the reductant supply source 30. Accordingly, the reductant quality sensor 34 determines the solution ratio of the reductant solution 25, and outputs a signal indicating the solution ratio to the rationality diagnostic control module 36. Based on the solution ratio, the reductant quality sensor 34 may determine the quality of the reductant solution 25 as described in detail above. For example, the reductant quality sensor 34 may determine that the reductant solution 25 has a first solution ratio (e.g., 32.5% urea and 67.5% $H_2O$). Based on the first solution ratio, the reductant quality sensor 34 may determine that the reductant solution 25 has a "nominal quality." If, however, the reductant quality sensor 34 determines that the reductant solution 25 has a second solution ratio (e.g., 16.25% urea and 83.75% $H_2O$), then the reductant quality sensor 34 may determine that the reductant solution 25 has a "reduced quality." The reductant quality sensor 34 may also determine a change of the amount of reductant solution 25 stored in reductant supply source 30. It is appreciated, however, that a separate sensor may be used to detect the amount of reductant solution 25 stored in reductant supply source 30.

The rationality diagnostic control module 36 may rationalize the operation and output of the reductant quality sensor 34. According to at least one exemplary embodiment, the rationality diagnostic control module 36 may electrically communicate with the control module 26 to determine a NOx conversion differential ($\Delta_{NOX}$) based on the measured NOx conversion and the modeled NOx conversion. The $\Delta_{NOX}$ may be calculated as the difference between the measured (i.e. actual) NOx conversion efficiency and the modeled (i.e., predicted) NOx conversion efficiency.

The rationality diagnostic control module 36 may also store in memory a lookup table (LUT) that cross-references a plurality of quality parameters with an expected $\Delta_{NOX}$ value and an expected $\Delta_{NOX}$ threshold value. The expected $\Delta_{NOX}$ value is a value indicating the expected $\Delta_{NOX}$ after injecting a reductant solution having a particular solution ratio. The plurality of quality parameters may include, for example, reductant solution ratio values. The rationality diagnostic control module 36 may rationalize the reductant quality sensor 34 based on a comparison between the sensed reductant solution ratio and the $\Delta_{NOX}$. More specifically, the rationality diagnostic control module 36 may receive the reductant solution ratio sensed by the reductant quality sensor 34 and may determine a respective expected $\Delta_{NOX}$ value. The reductant quality sensor 34 may calculate the actual $\Delta_{NOX}$ value based on measured and modeled NOx values received from the control module 26, and may then compare the actual $\Delta_{NOX}$ value to the expected $\Delta_{NOX}$ value indicated by the LUT. If the actual $\Delta_{NOX}$ value is below the respective $\Delta_{NOX}$ threshold indicated by the LUT, for example, then the rationality diagnostic control module 36 may determine that the reductant quality sensor 34 is unsatisfactory or deficient. In this regard, the rationality diagnostic control module 36 may determine that the reductant quality sensor 34 is incorrectly detecting the solution ratio of the reductant solution 25 (i.e., the quality of the reductant solution).

According to another embodiment, if the actual $\Delta_{NOX}$ value is equal to or above the respective $\Delta_{NOX}$ threshold indicated by the LUT, for example, then the rationality diagnostic control module 36 may determine that the reductant quality sensor 34 is satisfactory or sufficient. The rationality diagnostic control module 36 may then output one or more reductant quality signals to the control module 26 indicating the rationality of the reductant quality sensor 34. Based on the reductant quality signals, the control module 26 may take one or more corrective actions to actively improve the NOx conversion as the solution ratio of the reductant solution 25 (i.e., the quality of the reductant solution) dynamically changes. According to at least one exemplary embodiment, a corrective action may include adjusting an amount of reductant solution 25 injected into the exhaust gas 16 to dynamically compensate for changes in the solution ratio. In this regard, an increased amount of reductant solution 25 may be injected to compensate for a reductant if the quality of the reductant solution 25 decreases. However, a decreased amount of reductant solution 25 may be injected if the quality of the reductant solution 25 increases.

Figure 2:
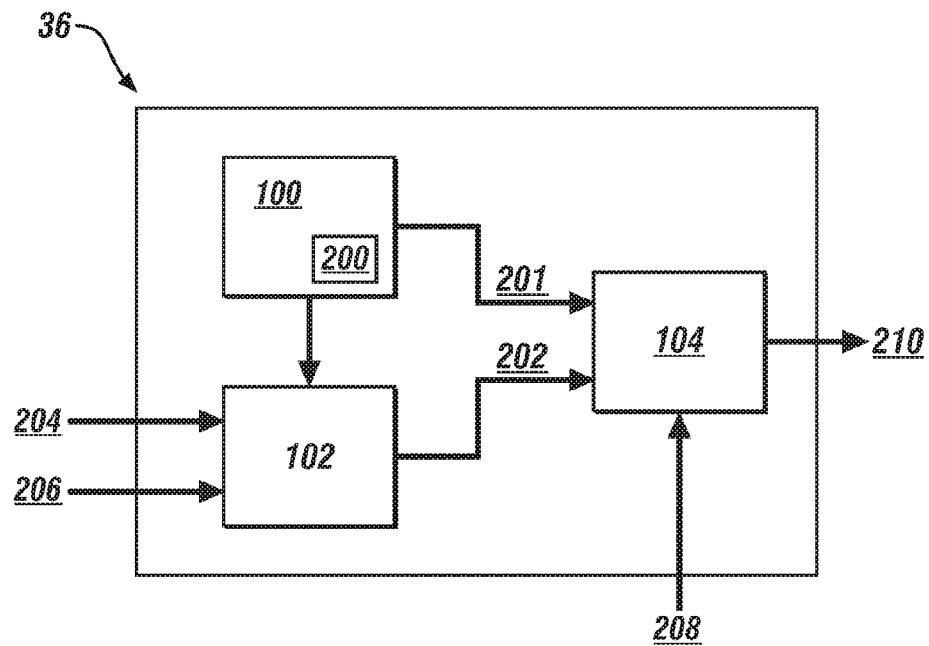
FIG. 2 is an electronic control module configured to rationalize a reductant quality sensor that determines a quality of a reductant solution delivered by an exhaust treatment system according to an exemplary embodiment.

Turning now to FIG. 2, an electronic rationality diagnostic control module 36 is illustrated according to at least one exemplary embodiment. The rationality diagnostic control module 36 includes a memory unit 100, an electronic NOx conversion unit 102, and an electronic rationalization unit 104. The memory unit 100 may store one or more parameter values, threshold values, and/or one or more lookup tables (LUTs). For example, the memory unit 100 may store a LUT 200 that cross-references a plurality of reductant solution ratio values with a respective expected $\Delta_{NOX}$ threshold value.

The electronic NOx conversion unit 102 may calculate an actual $\Delta_{NOX}$ value 202 based on a measured NOx conversion parameter 204 indicating an actual NOx conversion performed by the SCR device 20 and a modeled NOx conversion parameter 206 indicating an expected NOx conversion performed by the SCR device 20. Each of the measured NOx conversion parameter 204 and the modeled NOx conversion parameter 206 may be received from the control module 26.

The electronic rationalization unit 104 may receive a sensed solution ratio 208 of the reductant solution 25 from the reductant quality sensor 34, and compare the sensed solution ratio 208 against the stored solution ratios 201 of the LUT 200 to determine a corresponding $\Delta_{NOX}$ threshold value. The electronic rationalization unit 104 may then compare the actual $\Delta_{NOX}$ value 202 to the determined $\Delta_{NOX}$ threshold value to rationalize the reductant quality sensor 34. If, for example, the actual $\Delta_{NOX}$ value 202 is below the $\Delta_{NOX}$ threshold value, then the electronic rationalization unit 104 may determine that the reductant quality sensor 34 is deficient. If, however, the actual $\Delta_{NOX}$ value 202 equals or exceeds the $\Delta_{NOX}$ threshold value then the electronic rationalization unit 104 may determine that the reductant quality sensor 34 is sufficient. Accordingly, the electronic rationalization unit 104 may output a rationalization signal 210 indicating the determined rationalization of the reductant quality sensor 34. According to at least one exemplary embodiment, the rationalization signal 210 may be received by the control module 26. Based on the rationalization signal 210, the control module 26 may take one or more corrective actions to actively improve the NOx conversion efficiency of the SCR device 20 as the solution ratio of the reductant solution 25 (i.e., the quality of the reductant solution) dynamically changes.

Figure 3:
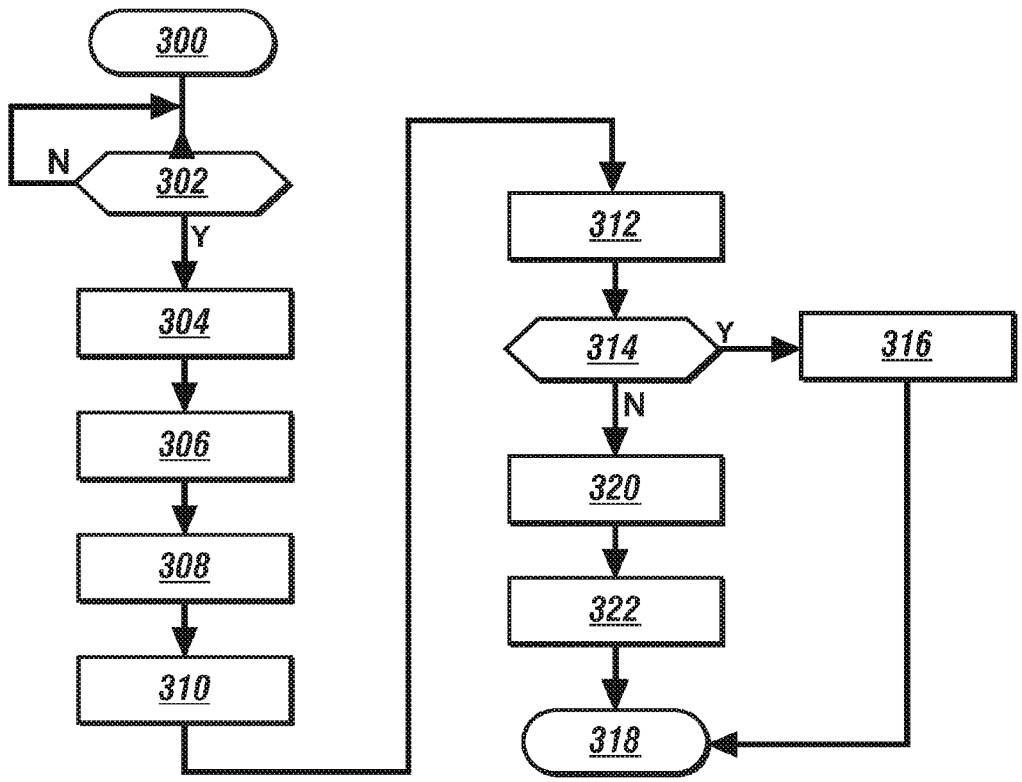
FIG. 3 is a flow diagram illustrating a method of rationalizing a reductant quality sensor included in an exhaust treatment system according to an exemplary embodiment.

Referring to FIG. 3, a method of rationalizing a reductant quality sensor is illustrated according to an exemplary embodiment. The method begins at operation 300, and at operation 302, a determination as to whether one or more entry conditions are satisfied is performed. If the entry conditions are not satisfied, the method returns to operation 302 to continue monitoring the entry conditions. If one or more entry conditions are satisfied, the method proceeds to operation 304. The one or more entry conditions may include whether an amount of $NH_3$ stored on the SCR device is consumed, and whether the exhaust gas temperature has reached a threshold temperature. For example, an amount of $NH_3$ previously stored on the SCR device may be determined at key-on (e.g., at engine start-up). Based on the temperature of the exhaust gas and the operating time of the engine, an amount of previously stored $NH_3$ that is consumed by the SCR device after engine start-up may be determined according to, for example, a model stored in memory. The determined amount of consumed $NH_3$ may be compared to a threshold value, and when the threshold value is satisfied the method may proceed to rationalize the reductant quality sensor as described, for example, below.

At operation 304, a reductant solution quality is measured by a reductant quality sensor. The reductant solution quality may be based on, for example, a solution ratio of a reductant solution. The reductant solution may have a first solution ratio of 32.5% urea and 67.5% $H_2O$, for example, indicating the reductant solution has a "nominal quality." The reductant solution may have another solution ratio of 16.25% urea and 83.75% $H_2O$, for example, indicating that the reductant solution has a "reduced quality." The reductant solution may have yet another solution ratio of 5% urea and 95% $H_2O$, for example, indicating that the reductant solution has a "deficient quality." At operation 306, a $\Delta_{NOX}$ threshold value corresponding to the measured reductant solution quality is determined. For example, a $\Delta_{NOX}$ threshold value of −0.06 (e.g., −6%) of an expected $\Delta_{NOX}$ conversion value may be determined if the solution ratio measured by the reductant quality sensor is 32.5% urea and 67.5% $H_2O$. However, a $\Delta_{NOX}$ threshold value of −0.25 (e.g., −25%) of an expected $\Delta_{NOX}$ conversion value may be determined if the solution ratio measured by the reductant quality sensor is 16.25% urea and 83.75% $H_2O$. The $\Delta_{NOX}$ threshold value and the corresponding expected $\Delta_{NOX}$ conversion value may be organized in a LUT 200 stored in a memory unit as described in detail above.

Turning to operation 308, a predicted NOx conversion is determined. The predicted NOx conversion may be determined according to a NOx conversion model as a function of one or parameters P1-PN. The parameters P1-PN may be measured by one or more sensors and/or calculated by an electronic control module. At operation 310, an actual NOx conversion is determined. The actual NOx conversion may be determined according to a first NOx sensor that measures the NOx level located upstream from an SCR device and a second NOx sensor that measures the NOx level located downstream from the SCR device. A NOx conversion differential ($\Delta_{NOX}$) based on the predicted NOx conversion and the actual NOx conversion is determined at operation 312. At operation 314, the $\Delta_{NOX}$ is compared to the determined $\Delta_{NOX}$ threshold value. If the $\Delta_{NOX}$ exceeds the $\Delta_{NOX}$ threshold value, the reductant quality sensor is determined as sufficient at operation 316 and the method ends at operation 318. If, however, the $\Delta_{NOX}$ is below the $\Delta_{NOX}$ threshold value, the reductant quality sensor is determined as deficient at operation 320. Depending on the reductant quality determined by the reductant quality sensor, the comparison to the $\Delta_{NOX}$ threshold value could be different. For example, in the case of a reductant solution having a nominal quality (e.g., of 32.5% urea and 67.5% $H_2O$), a deficient reductant quality sensor may be determined when $\Delta_{NOX}$ is less than the $\Delta_{NOX}$ threshold value. In another case of reductant solution having a deficient quality (e.g., of 5% urea and 95% $H_2O$), a deficient reductant quality sensor may be determined when $\Delta_{NOX}$ exceeds the $\Delta_{NOX}$ threshold value. At operation 322, the reductant solution quality is compensated and the method ends at operation 318. The reductant solution quality may be compensated in various manners including, but not limited to, adjusting an amount of reductant solution injected into the exhaust gas to dynamically compensate for changes in the solution ratio.

As used herein, the term "module" refers to a hardware module including an Application Specific Integrated Circuit (ASIC), an electronic circuit, a processor (shared, dedicated, or group) and memory that execute one or more software or firmware programs, a combinational logic circuit, and/or other suitable components that provide the described functionality.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. An exhaust gas treatment system included in a vehicle having an internal combustion engine, comprising:
    a reductant delivery system configured to introduce a reductant solution to an exhaust gas flowing through the exhaust gas treatment system;
    a selective catalyst reduction device configured to chemically react with the reductant solution to induce a NOx conversion that reduces a level of NOx in the exhaust gas;
    a reductant quality sensor configured to generate an electrical signal indicating a quality of the reductant solution; and
    a rationality diagnostic control module configured to rationalize the reductant quality sensor based on a comparison between the quality of the reductant solution and the NOx conversion.

2. The exhaust gas treatment system of claim 1, wherein the rationality diagnostic control module determines a NOx conversion efficiency of the selective catalyst device based on the NOx conversion, and determines a NOx conversion differential based on the NOx conversion efficiency.

3. The exhaust gas treatment system of claim 2, wherein the NOx conversion differential is based on a measured NOx conversion and a modeled NOx conversion.

4. The exhaust gas treatment system of claim 3, wherein the measured NOx conversion is based on a first NOx value determined by a first sensor disposed upstream from the selective catalyst device and a second NOx value determined by a second sensor disposed downstream from the selective catalyst device.

5. The exhaust gas treatment system of claim 4, wherein the modeled NOx conversion is based on a stored NOx conversion model, a level of ammonia ($NH_3$) stored on the selective catalyst device, and a temperature of the selective catalyst device.

6. The exhaust gas treatment system of claim 5, wherein the rationality diagnostic control module determines a NOx differential threshold based on the quality of the reductant solution, and the comparison further includes comparing the NOx differential to the NOx differential threshold.

7. The exhaust gas treatment system of claim 6, wherein the rationality diagnostic control module determines that the reductant quality sensor is deficient in response to the NOx differential being below to the NOx differential threshold.

8. The exhaust gas treatment system of claim 7, wherein a corrective action is performed to compensate the reductant solution in response to determining that the reductant quality sensor is deficient.

9. The exhaust gas treatment system of claim 8, wherein the corrective action includes adjusting an amount of reductant solution introduced into the exhaust gas based on the quality of the reductant solution.

10. The exhaust gas treatment system of claim 9, wherein the quality of the reductant solution is based on a solution ratio comprising an amount of ammonia ($NH_3$) in the reductant solution.

11. The exhaust gas treatment system of claim 10, wherein the solution ratio is based on an amount of ammonia ($NH_3$) with respect to an amount of water ($H_2O$) in the reductant solution.

12. An electronic control module configured to rationalize a reductant quality sensor that determines a quality of a reductant solution delivered by an exhaust treatment system, comprising:
   a memory unit configured to store a lookup table that indexes a plurality of quality parameters corresponding to a quality of a reductant solution and a NOx conversion threshold value corresponding to each quality parameter;
   an electronic NOx conversion unit configured to determine a NOx conversion differential value based on a measured NOx conversion parameter and a modeled NOx conversion parameter; and
   an electronic rationalization unit configured to compare the quality of the reductant solution to the quality parameters of the lookup table to determine a corresponding NOx conversion threshold value, and to rationalize the reductant quality sensor based on a comparison of the NOx conversion differential value and the determined NOx conversion threshold value.

13. The electronic control module of claim 12, wherein the measured NOx conversion parameter indicates an actual NOx conversion efficiency performed by a selective catalyst converter device and the modeled NOx conversion parameter indicates an expected NOx conversion efficiency performed by the selective catalyst converter device.

14. The electronic control module of claim 13, wherein the quality parameters and the quality of a reductant solution are based on an amount of ammonia ($NH_3$) in the reductant solution.

15. A method of rationalizing a reductant quality sensor included in an exhaust treatment system of a vehicle having an internal combustion engine, the method comprising:
   introducing a reductant solution to an exhaust gas flowing through the exhaust gas treatment system;
   inducing a NOx conversion that reduces a level of NOx in the exhaust gas in response to the reductant solution;
   determining a quality of the reductant solution; and
   rationalizing the reductant quality sensor based on a comparison between the quality of the reductant solution and the NOx conversion.

16. The method of claim 15, wherein the NOx conversion defines a NOx conversion efficiency of the selective catalyst device.

17. The method of claim 16, wherein the NOx conversion efficiency includes a NOx conversion differential based on a measured NOx conversion and a modeled NOx conversion.

18. The method of claim 17, further comprising determining a NOx differential threshold based on the quality of the reductant solution, and comparing the NOx conversion differential to the NOx differential threshold to rationalize the reductant quality sensor.

19. The method of claim 18, further comprising determining that the reductant quality sensor is deficient in response to the NOx conversion differential being below the NOx differential threshold.

20. The method of claim 19, further comprising performing a corrective action to compensate for the reductant solution in response to determining that the reductant quality sensor is deficient.

* * * * *